Jan. 17, 1950 A. W. ERNESTUS 2,494,748
PISTON
Filed Feb. 16, 1946

Inventor
Adolph W. Ernestus
By Elwin C. Andrus
Attorney

Patented Jan. 17, 1950

2,494,748

UNITED STATES PATENT OFFICE 2,494,748

PISTON

Adolph W. Ernestus, Milwaukee, Wis., assignor to A. O. Smith Corporation, Milwaukee, Wis., a corporation of New York Application February 16, 1946, Serial No. 648,189

1 Claim. (Cl. 309—9)

This invention relates to a piston having a heat dam and to a method of constructing the heat dam.

In order to prevent the conduction of excessive heat from the piston crown to that part of the piston which contains the piston rings and the skirt, certain types of pistons, particularly those used in high compression internal combustion engines, may be provided with a heat dam on the inside of the piston on or below the piston crown. This location of the heat dam causes not only considerable difficulty in the manufacture of pistons with a forged crown but also in the machining of heat dams on the inside of the piston, particularly because the mounting of the trunnions usually leaves very little space for tools to reach the proper heat dam location on the inside of the piston.

The principal object of the present invention is to overcome the difficulties in machining a heat dam on the inside of a piston and to provide a piston with a heat dam where no machining for the heat dam is required on the inside of the piston.

Another object is to provide a piston in which conduction of heat from crown to skirt is substantially lessened by employment of heat insulating material in a groove therebetween.

A preferred embodiment of the invention is illustrated in the accompanying drawing in which.

Figure 1:
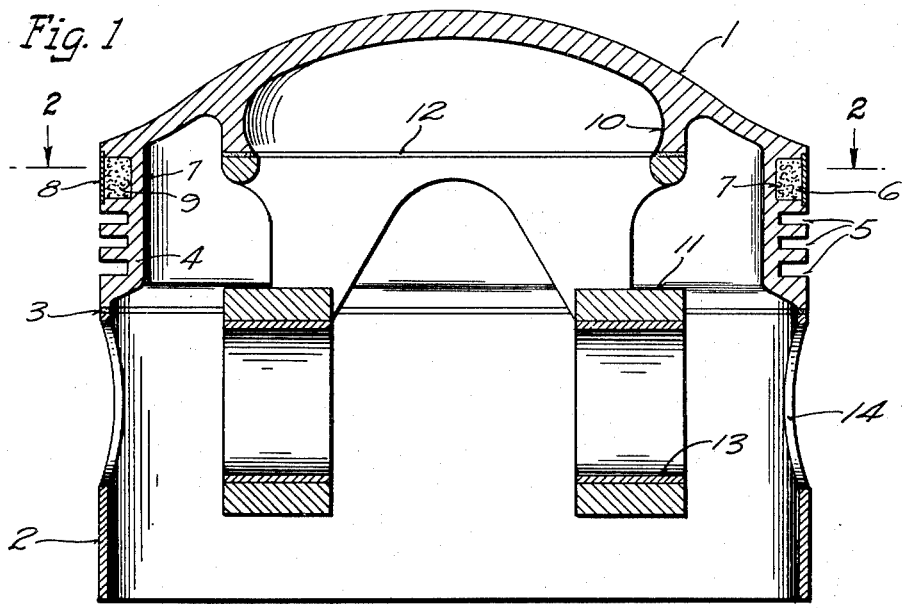
Figure 1 is a vertical sectional view of a piston.
Figure 2:
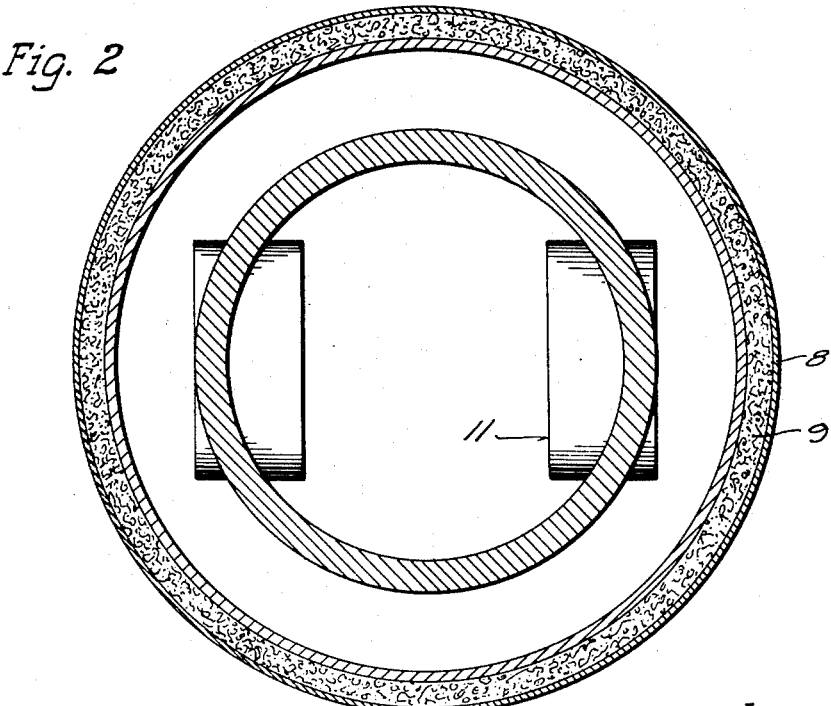
Fig. 2 is a transverse section taken on the line 2—2 of Fig. 1.

The piston illustrated in the drawings is formed of a crown or piston head 1 and skirt 2 welded together at 3.

The crown 1 is forged with cylindrical flange 4.

The flange 4 has a number of circumferential grooves 5 machined in its outer surface for receiving piston rings. The flange 4 also has a larger circumferential groove 6 machined therein just below the top of the piston head. The depth of groove 6 and its width at the base should be sufficient to provide the relatively thin connecting web 7 between the top of the piston and its side. The thin web 7 constitutes a heat dam that prevents excessive flow of heat from the top of the crown to the side wall of the piston.

In order to prevent carbon from forming in groove 6 and at the same time prevent neutralization of the effect of the heat dam, a low conductivity thin ring member 8 is placed over the mouth of groove 6 substantially flush with the outer surface of the piston wall. The member 8, for example, may be a ring sweated into place or may be a band fastened mechanically or welded at the meeting edges.

Before the groove 6 is closed it may be filled with sodium or like relatively heat stable material 9 which is a poor heat conductor and prevents carbon accumulation therein.

The flange 10 extends inwardly of the crown and is radially spaced from web 7. Flange 10 is forged in the initial forging of crown 1.

The trunnions 11 are welded to flange 10 as at 12. The bearings 13 of the trunnions have horizontal aligned openings therethrough in line with apertures 14 which extend radially through the piston wall for passage of a connecting rod, not shown.

The invention eliminates the difficulties encountered, due to the proximity of flange 10 to the web area, in machining the heat dam on the inside and also the bosses of trunnions 11.

Various embodiments of the invention may be employed within the scope of the accompanying claim.

The invention is claimed as follows:

A piston for internal combustion engines and the like comprising a crown and a cylindrical skirt-like side wall depending from said crown, said side wall having a circumferential groove in the outer surface of said side wall and spaced downwardly from the periphery of said crown, said groove constituting a heat dam between the periphery of said crown and said depending side wall, and a thin closure ring of material of low heat conductivity inset into said side wall and extending across the mouth of said groove and spaced downward from the periphery of said crown, said thin closure ring being protected by the periphery of said crown against direct exposure to hot products of combustion above said crown.

ADOLPH W. ERNESTUS.

REFERENCES CITED

The following references are of record in the file of this patent:

UNITED STATES PATENTS

| Number | Name | Date |
|---|---|---|
| 1,407,202 | Kubler | Feb. 21, 1922 |
| 1,494,483 | Howe | May 20, 1924 |
| 1,584,265 | Williams | May 11, 1926 |
| 1,678,957 | Philipp | July 31, 1928 |
| 1,831,583 | Weiss | Nov. 10, 1931 |

FOREIGN PATENTS

| Number | Country | Date |
|---|---|---|
| 28,593 | Great Britain | of 1911 |
| 325,194 | Great Britain | Feb. 3, 1930 |
| 358,958 | Great Britain | Apr. 10, 1930 |